(12) United States Patent
Menard

(10) Patent No.: US 6,402,490 B1
(45) Date of Patent: Jun. 11, 2002

(54) TIRE CASING VULCANIZATION MOLD

(75) Inventor: Gilbert Menard, Volvic (FR)

(73) Assignee: Michelin Recherche et Technique, S.A., Granges-Paccot (CH)

( * ) Notice: Subject to any disclaimer, the term of this patent is extended or adjusted under 35 U.S.C. 154(b) by 0 days.

(21) Appl. No.: 09/441,016

(22) Filed: Nov. 16, 1999

(30) Foreign Application Priority Data

Nov. 18, 1998 (FR) .............................. 98/14520

(51) Int. Cl.[7] .......................... B29C 35/02; B29D 30/06
(52) U.S. Cl. .......................................... 425/36
(58) Field of Search .......................................... 425/36

(56) References Cited

U.S. PATENT DOCUMENTS

| | | | | |
|---|---|---|---|---|
| 1,350,117 A | * | 8/1920 | Schmidt | 425/36 |
| 1,989,363 A | * | 1/1935 | Iverson | 425/36 |
| 2,901,771 A | * | 9/1959 | Frohlich et al. | 425/36 |
| 2,913,765 A | * | 11/1959 | Frohlich et al. | 425/36 |
| 2,921,337 A | * | 1/1960 | Frohlich et al. | 425/36 |
| 3,012,277 A | * | 12/1961 | Soderquist | 425/36 |
| 3,184,794 A | * | 5/1965 | Sherkin | 425/36 |
| 4,028,029 A | * | 6/1977 | MacMillan | 425/36 |
| 4,575,438 A | | 3/1986 | Fike et al. | 264/36 |
| 5,078,584 A | * | 1/1992 | Drewel et al. | 425/36 |
| 5,961,913 A | * | 10/1999 | Haase | 425/36 |

FOREIGN PATENT DOCUMENTS

| | | |
|---|---|---|
| GB | 1231597 | 5/1971 |
| JP | 57059743 | 4/1982 |

* cited by examiner

Primary Examiner—James P. Mackey
(74) Attorney, Agent, or Firm—Baker Botts L.L.P.

(57) ABSTRACT

A mold for vulcanizing a tire casing having two beads by direct action of a fluid on the inner walls of the casing, the mold including two crowns for respectively molding the outer surface of each of the beads, each molding crown including, successively and axially from the center of the mold to the outside of the mold, a first annular section having an outer surface supporting the corresponding bead, on shaping of the rough tire casing, and a second annular section for the molding the corresponding head and securing the tightness of the mold.

7 Claims, 3 Drawing Sheets

TIRE CASING VULCANIZATION MOLD

BACKGROUND OF INVENTION

The invention concerns a mold for vulcanization of tire casings by direct action of a fluid on the inner walls of a tire casing having two beads.

In the generally used methods of vulcanization of rough tire casings, the blank is shaped and laid on a vulcanization mold by means of an inflatable and heatable rubber bladder, which can be thick and is commonly called a vulcanization bag, or which can be thin and is then called a vulcanization membrane.

The problems associated with those methods are due, on the one hand, to the device or press necessary for the operations of placement and removal of the bladder and, on the other, to the nature of the inflation bladder itself. In fact, the bladder is sensitive to wear due to multiple use and has to be replaced after a number of curings have been performed, a replacement operation that is, on the one hand, expensive and, on the other, causes a downtime of the vulcanization press that is reflected in the cost of the tire, especially considering that the rubber bladder is a heat screen and does not allow for vulcanization as rapidly as might be desired. Furthermore, possible heterogeneities of the bladder are encountered, on completion of vulcanization, in the finished tire and directly affect production. In the shaping process, for example, the thinner portions of the inflatable bladder stretch more than other regions and produce defects on the tire casing which are manifested by excessive expansion of the casing mounted on a rim at the corresponding places on said rim. It can be further mentioned that the inflatable bladder contains on its outer surface a series of grooves intended for evacuation of the air trapped between the tire casing and the bladder. In the vulcanization process, said grooves can cause deformations of the interior layers of the carcass reinforcement. Furthermore, and in particular, in the case of use of a membrane, numerous wrinkles exist on said membrane and the lack of uniformity thus created is reflected on the tire itself.

To overcome the abovementioned disadvantages, it was decided, to abandon the use of an inflation and vulcanization bladder and to cause the vulcanization fluid to act directly on the inner wall of the tire casing. However, in order to meet the requirements of correct positioning of the beads and tightness of the mold, the beads of the casing must be pressed in the axial direction and by means of circumferential press plates against the corresponding surfaces of the vulcanization mold, as described, for example, in French Patent 1,345,102.

In those known vulcanization systems without the inflation bladder, the use of press plates or rings creates, first of all, mechanical difficulties, the placement of such plates after closing of the press demanding a high degree of mechanical precision and, secondly, heat problems, the part of the bead axially compressed escaping the action of the heating fluid, which obviously produces a vulcanization temperature variation in the bead itself and therefore creates a notable vulcanization difference, with a heterogeneous quality of batches and, consequently, a markedly diminished endurance of the beads.

The invention is intended to overcome all these disadvantages.

SUMMARY OF THE INVENTION

According to the invention, the vulcanization mold for a tire casing having two beads for vulcanization by direct action of a fluid on the inner walls of said casing, said mold comprising two crowns for molding the outer surface of each of the beads, is characterized in that each molding crown successively comprises, axially from the center of the mold to the outside of the latter, a first annular section having an outer bearing surface to support the corresponding bead, on shaping of the rough tire casing, and a second annular section, axially adjacent said bearing surface and axially more outward from the latter, providing for the molding of said bead and the tightness of the mold.

The presence of those two separate annular sections, one responsible for the shaping operation and the other for the molding operation, makes it possible to avoid resorting to the use of press plates or rings in contact with the interior surface of the beads, nevertheless ensuring a good positioning of the beads and, therefore, of the tire casing in the mold and guaranteeing the tightness of the latter.

The second section successively comprises, axially from the center of the mold to the outside of the latter, a circumferential bearing in contact with the first section, a circumferential groove and a roughly truncated cone-shaped portion, the bearing having a roughly cylindrical surface, whose diameter is greater than the minimum interior diameters of the rough and cured tire casing. The minimum diameter defined by the bead of said casing is designated by the interior minimum diameter of the tire casing.

The presence of this bearing makes it possible, on the one hand, to ensure, on shaping of the tire casing, that the beads are borne on the first sections of the molding crowns and, on the other, to ensure, in cooperation with the groove, the maintenance of tightness of the mold. Preferably, no vent is provided, in contrast to what is often done, on the entire radially outer surface of said crowns. The surface of the crowns of the mold is totally airtight.

Other characteristics and advantages of the invention will be apparent from the description which follows of a working example of a vulcanization mold according to the invention, with reference to the attached drawings:

DESCRIPTION OF PREFERRED EMBODIMENTS

Figure 1:
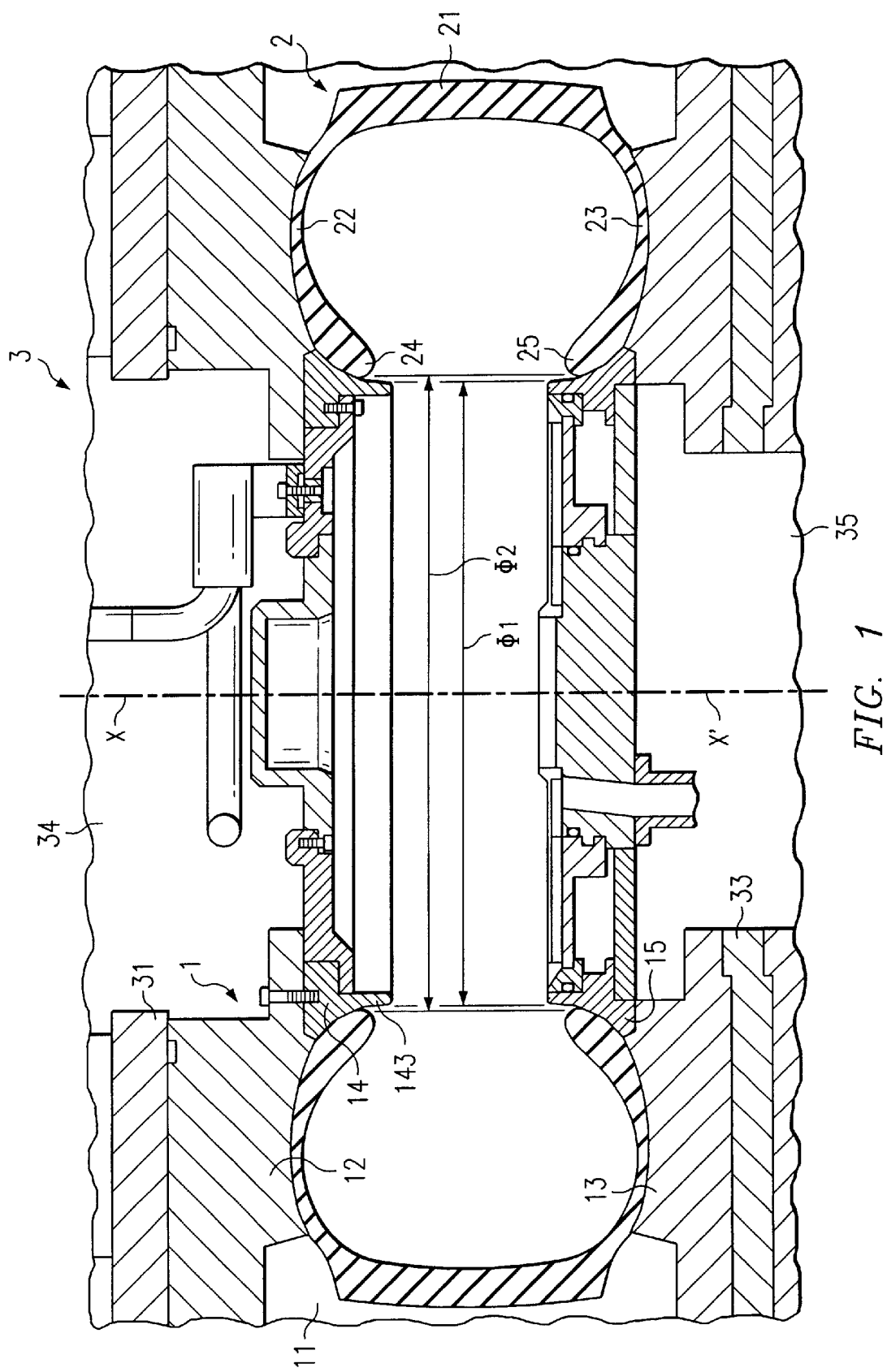
FIG. 1 is a view in radial section of the vulcanization mold according to the invention, in closed position.

The vulcanization mold 1, according to FIG. 1, acts directly by means of a fluid on the inner walls of a rough tire casing 2 to be vulcanized. The casing 2 comprises, notably, a tread 21, two sides 22, 23 and two beads 24, 25. The minimum diameters of the rough and cured tire casing 2 will be designated respectively as $\Phi 1$ and $\Phi 2$.

The mold 1 comprises molding elements 11 for the outer surface of the tread, two shells 12, 13 for respectively molding the outer surface of each of the sides 22, 23 and two crowns 14, 15 for respectively molding the outer surface of each of the beads 24, 25, each crown 14, 15 being mounted in one piece with one of the shells 12, 13.

In some embodiments, the crowns can be made in a single piece with the corresponding shells. It does not matter whether the crown is integrated with the shell or separated from it. However, it will be preferred here, to facilitate manufacture of the crowns, for the parts to be separated.

The molding and stripping of a tire involve relative axial movements, that is, defined by axis XX' of the mold 1 between the tire 2 and each of the shells and crowns ensuring its molding. Sectors moving in relation to the shells 12, 13 and to the crowns 14, 15 can be used as molding elements for the outer surface of the tread 21.

FIG. 1 also shows a press 3 which carries the mold 1. The press 3 has a lower frame 33 on which shell 13 is fastened and a moving frame, also called upper frame 31, on which shell 11 is fastened. Some parts of the press are designated here by the adjectives "lower" and "upper" in order to follow the usual terminology, for the presses are generally made to receive a mold positioned with vertical axis. The lower or upper position of the elements of the press is, of course, not limitative and the terms are used only to conform with terminology used in the trade.

There is, in addition, a lower platen 35 and an upper platen 34. The movements imparted to the lower platen 35 and to the upper platen 34 are well known and make possible or facilitate loading of a rough tire casing to be vulcanized and its unloading after vulcanization.

Figure 2:
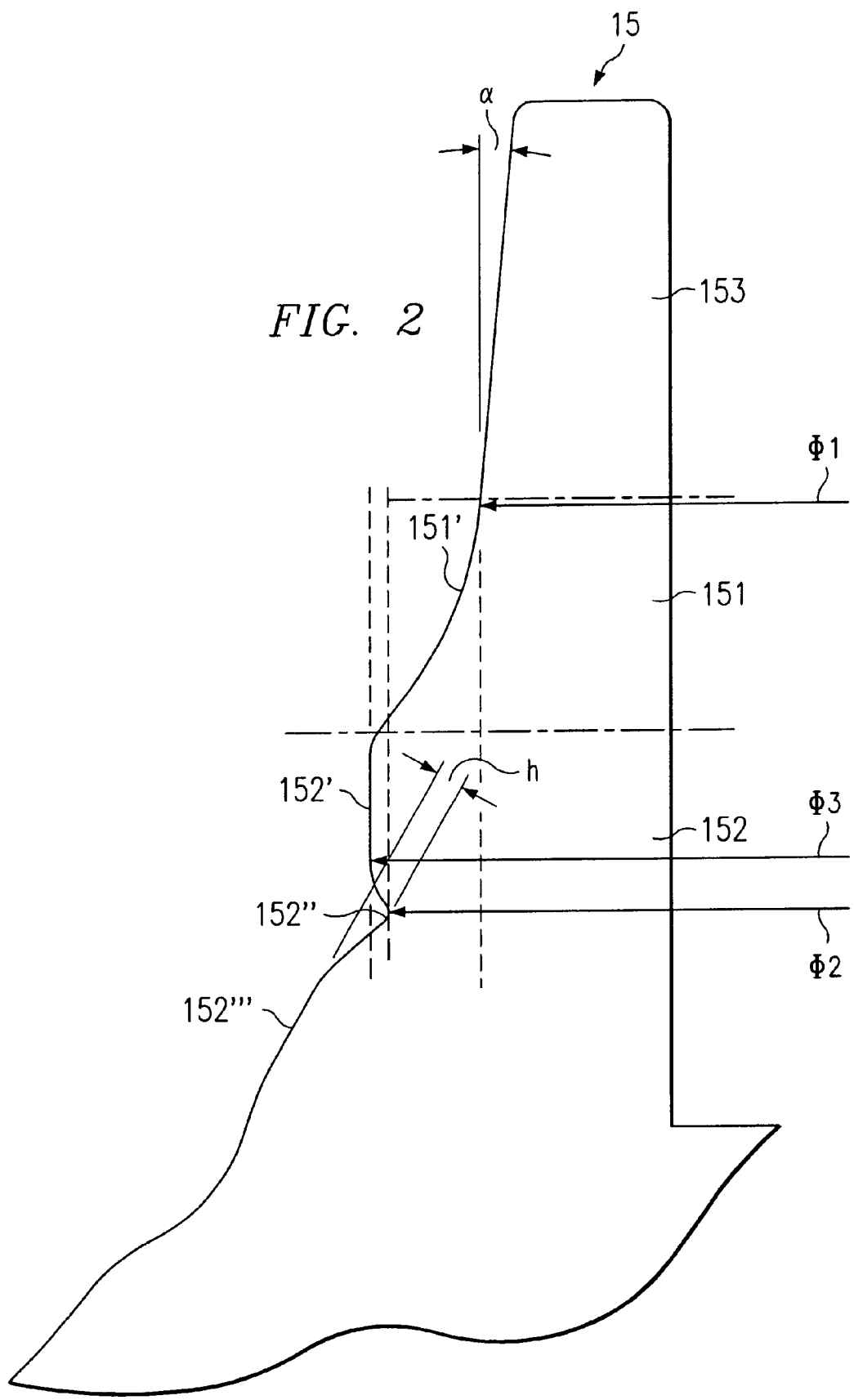
FIG. 2 is an enlargement of FIG. 1 partially representing one of the crowns of the mold.

Only one of the molding crowns 15 will be described below with reference to FIG. 2, the two crowns 14 and 15 being identical. In this figure, the ends of the arrows indicate the different diameters taken into account in the description.

Crown 15 successively comprises, axially from the center of the mold 1 to the outside of the latter, a first annular section 151 having an outer surface 151 ' bearing the corresponding bead on shaping of the rough tire casing and a second annular section 152 defining the molding of said bead and securing tightness of the mold 1.

The sections 151 and 152 of crown 15 possess the following characteristics:

The outer surface 151 ' of section 151 is concave and has a radius of curvature corresponding roughly to the radius of curvature of the bead of the rough tire casing. This arrangement makes possible an easy placement of the bead 25 on surface 151', the bead taking the shape of said surface;

Section 152 successively comprises, axially from the center of the mold 1 to the outside of the latter, a circumferential bearing 152' in contact with the first section 151, a circumferential groove 152" and a roughly truncated cone-shaped portion 152''' which is extended by shell 13 and whose shape corresponds to a more "standard" molding zone, that is, whose shape is not specific to having a membraneless curing mold.

The bearing 152' has a roughly cylindrical surface of diameter $\Phi 3$ greater than the minimum inner diameter $\Phi 1$ of the rough tire casing (and than that of the cured casing, $\Phi 2$), so that shaping of the tire casing is carried out by bearing on section 151 and not on section 152. It is the pressure subsequently exerted on the inner walls of the tire casing that makes placement of the beads possible on the second sections 152 of the crowns.

Grove 152", whose diameter requires the minimum diameter $\Phi 2$ of the cured tire casing, has a depth h ranging between 0.5 mm and 4 mm and a length compatible with the criteria required for ensuring the tightness and mounting of the tire casing on a rim, as specified in French Patent Application No. 98/09674.

The groove thus corresponds to a compromise, notably as to its size, making it possible to ensure tightness of the mold without subsequently interfering with extraction of the cured tire casing.

In fact, in a vulcanization mold according to the invention, the fluid being directly in contact with the inner walls of the tire casing, it is necessary to be able to prevent that fluid from passing between the casing and the molding elements of the mold.

Furthermore, on curing of a tire in a mold with bladder, the rubber flows to the end of the beads, constituting a toe between the molding elements and the bladder, which renders the minimum inner diameter of the cured casing less than that of the rough casing, while in a bladderless mold, the rubbery products are shrunk on the wire in each bead and the minimum inner diameter of the cured tire casing is greater than that of the rough casing.

It is therefore necessary also to take these phenomena into account to manage to secure good tightness. The presence of the groove 152" makes it possible to secure the tightness, guaranteed by the bearing 152', the diameter of which is less than that of the minimum diameter of the cured tire casing. Furthermore, the presence of the bearing makes it possible to reinforce the bead welds by thus expelling the air present between the welded zones.

Let us note that the tire casing obtained with this mold has rounded beads with a rib which will also serve later to secure the tightness of the tire casing upon its mounting on a rim.

The crown 15 also includes a third truncated cone-shaped section 153. for precentering of the tire casing in the mold, situated in the axial extension of the first section 151 toward the center of the mold. Said section 153 possesses a generatrix forming an angle α of approximately 5° with the axis of the mold, which makes it possible to secure good placement of the beads and, therefore, good centering of the rough tire, on loading of the latter.

The process of vulcanization of a tire casing in a vulcanization mold according to the invention will be briefly described below, with reference to FIGS. 3A to 3C.

First of all, let us note that the invention extends to a process of vulcanization of a tire casing 2 having two beads 24, 25, by means of a mold for vulcanization by direct action of a fluid on the inner walls of said casing, the mold having two crowns 14, 15, each having a bead receiving surface radially oriented outward from the mold, at least one part of these receiving surface is used for molding the outer surface of one of the beads 24, 25, the axial width of said receiving surface being greater than the axial width of the bead in vulcanized state, comprising the following steps;

positioning at least one of the beads 24, 25 of the tire casing 2 on one part of the receiving surfaces, and at least one of the bead;

bringing the crowns closer to each other axially until contact of each receiving surface with each bead, then shaping the tire casing 2 and continuing to bring them together up to the final tire molding mark;

vulcanizing the tire casing by bringing the said vulcanizing fluid into direct contact with its inner wall.

The movement thus proposed makes possible a use of the mold in which, on reception of the tire casing in the press, the crowns do not go beyond the molding positions. In the case of the crowns according to the invention, it is not necessary to continue until contact of the crowns with each other to secure the tightness making shaping of the tire possible. There is no excessive axial stress on the rough tire, for there is no passage beyond the vulcanization mark. The tire casing 2 is brought, with the aid of a bracket not shown, above the open mold 1 and lowered along axis XX' into said mold, the lower bead 25 being centered on the section 153 for precentering of the lower crown 15, until contact of said bead with the surface 151 ' of the support section 151.

Figure 3A:
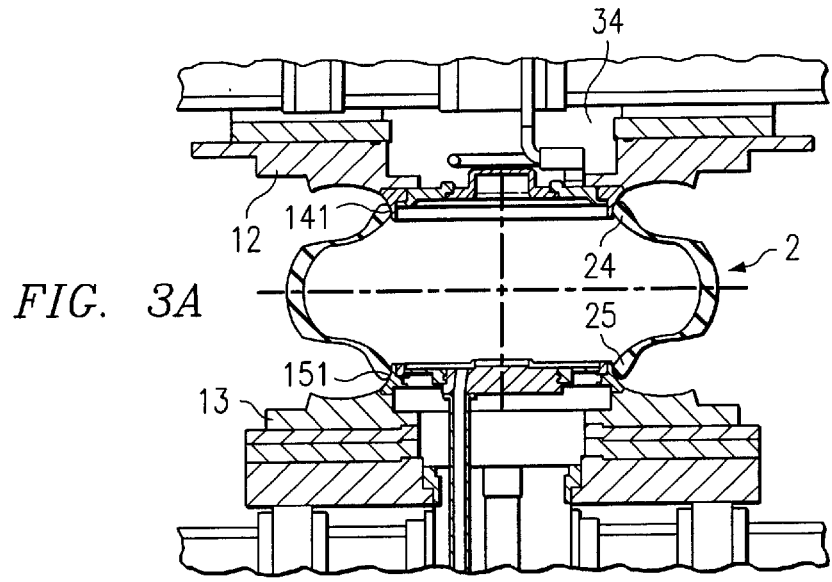
FIGS. 3A to 3C are schematic representations in radial section of the stages of operation of the mold shown in FIG. 1.

The bracket is then removed, and the upper platen 34 of the press 3 is lowered, the section 143 for precentering of the upper crown 14 securing correct placement of the upper bead 24, which comes to bear on the support section 141, as shown in FIG. 3A.

Figure 3B:
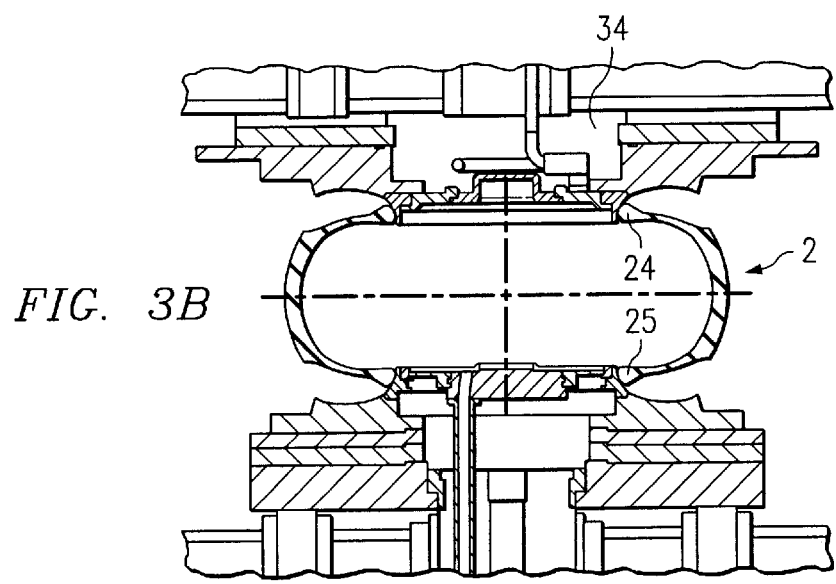
Figure 3C:
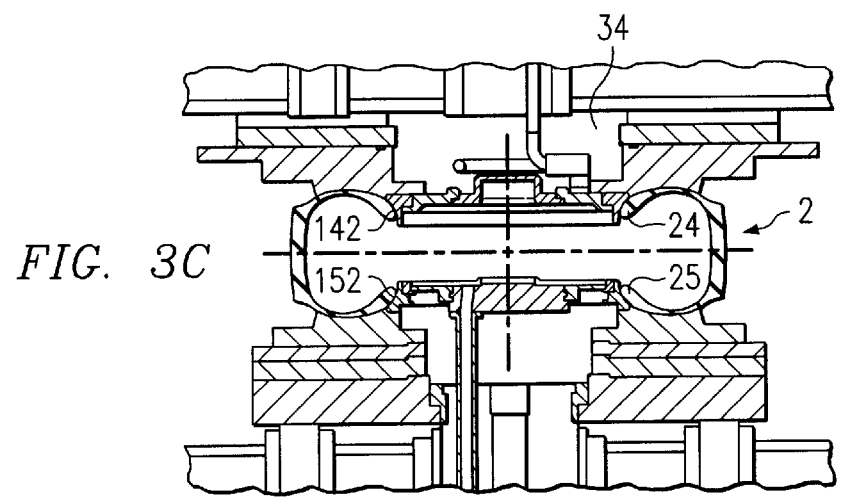

According to FIG. 3B, continuing to lower the upper platen 34, the platens and, therefore, the crowns are brought together, which makes it possible to shape said casing, thus rotating the beads 24 and 25 on surfaces 151' and 141', a rotation facilitated by the presence of bearings 152' and 142', the diameters of which are greater than the inner diameters of the rough casing.

The pressure is then substantially and rapidly increased in the tire casing 2 by introduction of a fluid in said tire casing directly in contact with the walls of the latter, and the mold 1 is simultaneously reclosed. Thus, the beads 24 and 25 are forced to pass beyond the bearings 152' and 142' axially outward from the mold 1 and to be laid on sections 152, 142. The outer surface of each bead 24, 25 comes to rest respectively on a bearing 142', 152', a groove 142", 152" and a truncated cone-shaped portion 142''', 152''' (FIG. 3C).

The pressure can then be raised inside the tire casing in order to carry out vulcanization.

It may be useful to provide a suction pipe or any equivalent means to eliminate the remaining fluids which might still be present against the lower side 23 in the tire casing, acting upon vulcanization or at the end of vulcanization once the pressure has been released. Unloading of the tire casing presents no particular difficulty, the low volume of rubber corresponding to the grooves 152" and 142" constituting for each bead a flexible heel which does not stand in the way of extraction of the casing.

I claim:

1. A vulcanization mold for a tire casing having two beads for vulcanization by direct action of a fluid on the inner walls of said casing, said mold comprising two crowns for respectively molding an outer surface of each of the beads, each molding crown successively comprising, axially from the center of the mold to the outside of the mold, a first annular section having an outer surface supporting the corresponding bead, on shaping of a rough tire casing, and a second annular section, axially adjacent and outwardly of said outer surface of said first annular section, for the molding of said bead and securing the tightness of the mold, said second annular section including successively and axially from the center of the mold, a circumferential bearing having a substantially cylindrical surface in contact with the first annular section, a circumferential groove and a truncated cone-shaped portion.

2. A mold according to claim 1, in which the cylindrical bearing surface has a diameter ($\Phi 3$) greater than the minimum interior diameter ($\Phi 1$) of the rough tire casing and the minimum interior diameter ($\Phi 2$) of the cured tire casing following vulcanization thereof in the mold.

3. A mold according to claim 1, in which each crown has a truncated cone-shaped third section for precentering of the tire casing in the mold, situated in the axial extension of the first section toward the center of the mold.

4. A mold according to claim 3, in which the truncated cone-shaped third section has a generatrix forming an angle ($\alpha$) of approximately 5° with the axis of the mold.

5. A mold according to claim 1, in which the outer surface of the first section is concave.

6. A mold according to claim 1, in which the circumferential groove has a depth (h) ranging between 0.5 mm and 4 mm.

7. A mold according to claim 1, in which the surface of said crowns is totally airtight.

* * * * *

UNITED STATES PATENT AND TRADEMARK OFFICE
CERTIFICATE OF CORRECTION

PATENT NO. : 6,402,490 B1  
DATED : June 11, 2002  
INVENTOR(S) : Gilbert Menard It is certified that error appears in the above-identified patent and that said Letters Patent is hereby corrected as shown below:

Title page,  
Item [57], ABSTRACT,  
Line 9, "head" should read -- bead --

Column 1,  
Line 41, "decided," should read -- decided --

Column 3,  
Lines 30 and 36, "151 ' " should read -- 151' --  
Line 57, "Grove" should read -- Groove --

Column 4,  
Line 41, "surface" should read -- surfaces --  
Lines 46-47, "at least one of the bead;" should be deleted  
Line 48, "¶bringing" should read -- bringing -- (append to line 46 after "and")  
Line 51, "mark;" should read -- mark; and --  
Line 67, "151 ' " should read -- 151' --

Signed and Sealed this

Twenty-eighth Day of January, 2003

JAMES E. ROGAN  
*Director of the United States Patent and Trademark Office*